United States Patent
Acharya et al.

(10) Patent No.: US 6,571,391 B1
(45) Date of Patent: May 27, 2003

(54) SYSTEM AND METHOD FOR SCHEDULING ON-DEMAND BROADCASTS FOR HETEROGENEOUS WORKLOADS

(75) Inventors: Swarup Acharya, New Providence, NJ (US); Shanmugavelayut Muthukrishnan, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/174,228

(22) Filed: Oct. 16, 1998

Related U.S. Application Data

(63) Continuation-in-part of application No. 09/112,675, filed on Jul. 9, 1998, now Pat. No. 6,112,221.

(51) Int. Cl.$^7$ ............................................. H04N 7/173

(52) U.S. Cl. ............................ 725/87; 725/91; 725/93; 725/97; 725/98; 725/114; 709/102

(58) Field of Search ............................ 725/87, 91, 93, 725/94, 97, 103, 114, 116, 138; 709/217–219, 102

(56) References Cited

U.S. PATENT DOCUMENTS

| | | | | |
|---|---|---|---|---|
| 5,815,662 A | * | 9/1998 | Ong | 395/200.47 |
| 5,926,649 A | * | 7/1999 | Ma et al. | 395/826 |
| 6,112,221 A | * | 8/2000 | Bender et al. | 709/102 |
| 6,212,562 B1 | * | 4/2001 | Huang | 709/227 |

OTHER PUBLICATIONS

Murata, Shionozaki, Tokoro, A Network Architecture for Reliable Process Group Communication, 1994, International Conference on Distributed Computing Systems, 1994, , ISBN 0–8186–5840–1.*

William Stallings, The Effect of Propagation Delay and Transmission Rate, Data and Computer Communications, NY, Macmillan Publishing Co., 1985, ISBN 0–02–415440–7.*

Bender, Chakrabarti, and Muthukrishnan, Proceedings of the ninth Annual ACM–SIAM Symposium on Discrete Algorithms, Jan. 1998.*

(List continued on next page.)

*Primary Examiner*—Andrew Faile
*Assistant Examiner*—Kieu-Oanh Bui
(74) *Attorney, Agent, or Firm*—Sofer & Haroun, LLP

(57) ABSTRACT

In accordance with one embodiment of the invention, a broadcast server system computes a feasible stretch value for use in scheduling job requests. A stretch value provides an indication of the delay experienced by each job request to complete, when the broadcast server processes many jobs concurrently. A processing time is calculated for each job request based on, the size of the job request and the bandwidth of the server downlink. Thereafter, a stretch value is proposed. The server system computes a deadline for each job to be the arrival time of the job request plus the product of the processing time and the proposed stretch value. Thereafter, each job request is scheduled, based on an "earliest deadline first" arrangement, wherein the job request that has the earliest deadline is scheduled first, the job request having the next earliest deadline is scheduled second, etc. The proposed stretch value is deemed feasible if each pending job request can be completed prior to its deadline. If the proposed stretch value is deemed not feasible, it is adjusted iteratively until a feasible stretch value is found. The feasible stretch value is then utilized to schedule the job requests to be broadcast by the system. When the broadcast of a job request is completed, all job requests for the same data item, which arrived prior to the start of the broadcast, are eliminated from the pending job requests.

22 Claims, 5 Drawing Sheets

OTHER PUBLICATIONS

S. Acharya et al. Broadcast Disks: Data Management for Asymmetric Communication Environments. In M. Carey and D. Schneider, editors. Proceedings of the 1995 ACM SIGMOD International Conference on Management of Data, pp. 199–210. San Jose, California, May 22–25, 1995.

D. Aksoy and M. Franklin. Scheduling for Large Scale On–Demand Data Broadcast. In Proc. Of IEEE INFOCOM. San Francisco, CA. Mar. 1998.

S. Acharya, M. Franklin and S. Zolonik. Dissemination–based Data Delivery Using Broadcast Disks. IEEE Personal Communications, 2(6), Dec. 1995.

S. Acharya, M. Franklin, and S. Zolonik. Balancing Push and Pull for Data Broadcast. In Proceedings of ACM SIGMOD, May 1997.

Paul Barford and Mark Crovella. Generating Representative Web Workloads for Network and Server Performance Evaluation. In Proceedings of ACM SIGMETRICS, 1998.

M. Bender, S. Chakrabarti, and S. Muthukrishnan. Flow and Stretch Metrics for Scheduling Continuous Job Streams. In Proceedings of the Ninth Annual ACM–SIAM Symposium on Discrete Algorithms, pp. 270–279, San Francisco, California, Jan. 25–27, 1998.

T. Bowen, G. Gopal, G. Herman, T. Hickey, K. Lee, W. Mansfield, J. Raitz, and A. Weinrib. The Data Architecture. CACM, 35(12), Dec. 1992.

Mark Crovella, Mor Harchol–Balter, and Cristina Murta. Task Assignment in a Distributed System: Improving Performance by Unbalancing Load. Technical Report 97–018, Boston University, Oct. 31, 1997.

M. Franklin and S. Zdonik. A Framework for Scalable Dissemination–Based Systems. Proc. Of International Conference Object Oriented Programming Languages Systems (OOPSLA), Oct. 1997.

David K. Gifford. Polychannel Systems for Mass Digital Communication. Communications of the ACM, 33(2), Feb. 1990.

G. Herman, G. Gopal, K. Lee, and A. Weinrib. The Datacycle Architecture for Very High Throughput Database Systems. In Proceedings of ACM SIGMOD, May 1994.

S. Hameed and N. Vaidya. Log–time Algorithms for Scheduling Single and Multiple Channel Data Broadcast. In Proceedings of the International Conference of Mobile Computing and Networking (MOBICOM), Sep. 1997.

T. Imiclinski and S. Viswanathan. Adaptive Wireless Information Systems. In Proceedings of SIGDBS Conference, Tokyo, Oct. 1994.

H. Kellerer, T. Tautenhahn, and G. Woeginger. Approximability and Nonapproximability Results for Minimizing Total Flow Time on a Single Machine. In Proc. 28th Annual ACM Symposium on the Theory of Computing, pp. 418–426, 1996.

R. Motwani, S. Phillips, and E. Torng. Non–Clairvoyant Scheduling. In Proceedings of the 4th Annual ACM–SIAM Symposium on Discrete Algorithms (SODA '93), pp. 422–431, Austin, TX, USA, Jan. 1993, SIAM.

H. Schwetman. CSIM: A C–Based Process Oriented Simulation Language. In Proceedings of 1986 Winter Simulation Conference, 1986.

S. Shekhar and D. Liu. Genesis and Advanced Traveler Information Systems (ATIS): Killer Applications for Mobile Computing. In Proceedings of MOBIDATA Workshop, Rutgers University, 1994.

K. Stathatos, N. Roussopoulos, and J. S. Baras. Adaptive Data Broadcast in Hybrid Networks. In Proceedings of the 23rd International Conference on Very Large Data Bases. Sep. 1997.

C. Su and L. Tassiulas. Broadcast Scheduling for Information Distribution. In Proceedings of IEEE INFOCOM, Los Alamitos, CA, USA, Apr. 1997, IEEE Computer Society Press.

John W. Wong. Broadcast Delivery. Proceedings of the IEEE, 76(12), Dec. 1988.

Hui Zhang. Service Disciplines for Guaranteed Performance Service in Packet–Switching Networks. Proceedings of the IEEE, 83(10), Oct. 1995.

* cited by examiner

SYSTEM AND METHOD FOR SCHEDULING ON-DEMAND BROADCASTS FOR HETEROGENEOUS WORKLOADS

This application is a continuation-in-part of a previously filed patent application Ser. No. 09/112,675, filed Jul. 9, 1998, now U.S. Pat. No. 6,112,221 entitled SYSTEM AND METHOD FOR SCHEDULING WEB SERVERS WITH A QUALITY OF SERVICE GUARANTEE FOR EACH USER, issued to Bender et. al., on Aug. 29, 2000, and is incorporated herein by reference.

FIELD OF THE INVENTION

This invention relates generally to broadcasting systems, and more particularly to the scheduling of job requests to be serviced in an on-demand broadcast system.

BACKGROUND OF THE INVENTION

The demand for broadcast technology has increased with the growth of wireless communication services. Broadcast technology is particularly well suited for disseminating a single item of data to a large number of users.

One type of broadcast system for disseminating information is the push-based system, in which a broadcast server delivers data using a periodic broadcast program based on pre-compiled access profiles and typically without any active user intervention. A broadcast application which transmits or pushes a continuous stream of data relating to stock prices, sports scores or weather forecasts is an example of a push-based system. Push-based systems, however, may not be suitable for dynamic workloads, because the preferences of actual users for a particular data item may differ significantly from the pre-compiled access profiles. In other words, poor performance may result because the scheduling of the data to be disseminated does not account for existing user preferences.

Another type of broadcast system currently being utilized to disseminate data, and the type to which the present invention is directed, is referred to as a pull-based, or "on-demand" broadcast system. In the on-demand broadcast setting, the server broadcasts information in response to explicit client requests to all users, including those who did not request the information. One example (of many) of an on-demand broadcast system that information. One example (of many) of an on-demand broadcast system that currently exists is one in which users request internet data over phone lines and the broadcast server delivers the data via satellite. Another example is a system which broadcasts news, sports and entertainment updates via a wireless interface and provides live audio or video capability in response to a user's request.

When explicit client requests are made for the same data items, a broadcast system is used to advantage by satisfying all of the pending job requests for that data item with a single broadcast of the data item. In this manner, a broadcast system is unlike a point-to-point or unicast system, which require that each client's request for data be individually satisfied, even if more than one client makes a job request for the same data item.

FIG. 1 illustrates a typical on-demand broadcast system. Devices 30a, 30b and 30d make requests for data which are delivered to broadcast server 10 by any uplink method. Specifically, device 30a makes a job request for data item a, device 30b makes a job request for data item b, and device 30d makes a job request for data item d. Broadcast server 10 receives the job requests and broadcasts the requested data via downlink 34 so as to satisfy the job requests. Many job requests may be made for the same data item. Therefore, server 10 may transmit the requested data item once to all of the requesting users at the same time.

Various arrangements for scheduling the broadcast of different data items which have been requested by users have been proposed. One scheduling arrangement, referred to as the "Longest Wait First" method (hereinafter "LWF method") examines the total waiting time for all of the pending job requests for specific data items. For example, there may be several job requests to the server for the same data item, each request having arrived at a point in time prior to the present. Furthermore, there may be additional requests to the server for another data item. For each job request, the server calculates the time that has elapsed since the job request arrived until the present. The server then sums all of the elapsed times for job requests for a particular data item. The data item which has the largest summed total of waiting times is serviced first, the data item which has the next largest summed total is serviced second, etc. Another scheduling arrangement which has been proposed is the "Shortest Service Time First" method (hereinafter "SSTF method"), in which the data item which can be transmitted in the least amount of time is serviced first.

Another scheduling method is proposed by D. Aksoy and M. Franklin in "Scheduling for Large Scale On-Demand Data Broadcast", March 1998. Generally, this scheduling method utilizes the frequency with which different data items are requested, so as to minimize overall average response time for data items. This method, however, can only be used for homogenous data items. The homogeneity of data items refers to the size of the data item, i.e.—data items are homogenous when they are identically sized. Thus, the scheduling method proposed in this prior art reference does not address heterogeneous data items.

Although the above-referenced scheduling methods for on-demand broadcast systems have attempted to address performance issues, there is an ever increasing need for improved scheduling methods that provide satisfactory performance in terms of worst case response time and overall average response time.

Therefore, there exists a need for a system and method for optimally scheduling the transmission of heterogeneous data items in an on-demand broadcast system.

SUMMARY OF THE INVENTION

In accordance with one embodiment of the invention, a method for scheduling responses in an on-demand broadcast system is disclosed. The method comprises the steps of receiving at a broadcast server a plurality of job requests for a plurality of data items, and determining an adaptive schedule for broadcasting the data items. In a departure from prior art scheduling methods for on-demand broadcast systems wherein a response to a job request is transmitted entirely before a following response is transmitted, the schedule in accordance with the present invention is adaptively determined such that the broadcast of a first data item may be interrupted upon receipt of a new job request, so as to broadcast a second data item in accordance with a new schedule, and such that the schedule eliminates job requests for a data item that are pending while the broadcast server broadcasts the requested data item.

In accordance with another embodiment of the invention, an on-demand broadcast server computes a feasible stretch value for use in scheduling heterogeneous job requests to be serviced. A stretch value provides an indication of the delay experienced by each job request to complete, when the server processes many job requests concurrently. In one embodiment, for a set of job requests to be serviced in an off-line setting (to be explained later), a processing time is calculated for each job request based on the size of the job and the bandwidth of the broadcast system. Thereafter, a stretch value is proposed and the broadcast server computes a deadline for each job to be the arrival time of the job request plus the product of the processing time and the proposed stretch value. Thereafter, each job request is scheduled, based on an "earliest deadline first" arrangement, wherein the job request that has the earliest deadline is scheduled first, the job request having the next earliest deadline is scheduled second, etc.

The proposed stretch value is deemed feasible if each pending job request can be completed, if performed in the order determined by the earliest deadline first methodology, prior to its deadline. If the proposed stretch value is deemed not feasible, it is adjusted iteratively until a feasible stretch value is found. Once the feasible stretch value is found, the job requests are serviced in the order dictated by the EDF schedule as found in the latest iteration. Once the broadcast of a job request has been completed, all of the pending job requests for the same data item, which arrived prior to the start of the broadcast, are necessarily simultaneously satisfied and can be eliminated from the pending job requests. According to one embodiment, the feasible stretch value is further adjusted until an optimal feasible stretch value is found, which equals the smallest feasible stretch value which permits, when serviced in the order dictated by the EDF schedule as found in the current iteration, all pending jobs to be completed prior to their deadline.

In another embodiment, job requests are serviced by an on-demand broadcast server in an on-line setting (to be explained later), in which the system services pending job requests prior to determining whether a modified stretch is feasible. In accordance with another embodiment of the invention, the system determines a schedule for a set of pending job requests as a function of all of the job requests from the arrival of the first job request to the system up to the arrival of the current job. In accordance with yet another embodiment of the invention, the system determines a schedule for a set of pending job requests as a function of the last n number of job arrivals, wherein n is an integer.

BRIEF DESCRIPTION OF THE DRAWINGS

The present invention will be further understood from the following description with reference to the accompanying drawings, in which.

DETAILED DESCRIPTION OF THE INVENTION

In accordance with one embodiment, the present invention comprises a system and method for scheduling the servicing of heterogeneous job requests (for data items) in an on-demand broadcast system.

Figure 1:
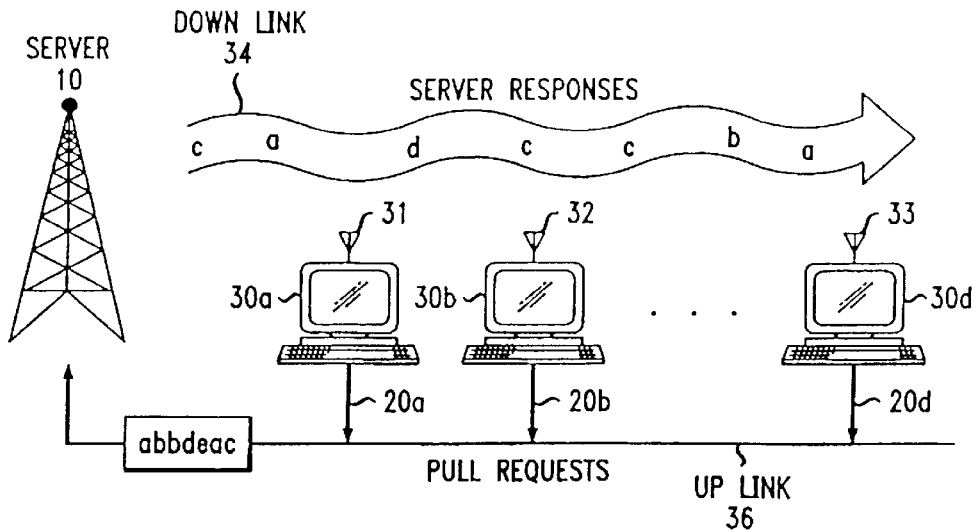
FIG. 1 illustrates an on-demand broadcast server system, as employed in one embodiment of the present invention.

As illustrated in FIG. 1, and in accordance with one embodiment of the invention, an on-demand broadcast system employs an arrangement for scheduling data broadcasts in response to a plurality of job requests. A broadcast server 10 is configured to transmit data items to a plurality of users in response to their demands. Devices 30a, 30b and 30d provide the requests for the data items which are delivered via uplink 36 to server 10. Specifically, device 30a provides a job request for data item a, device 30b provides a job request for data item b, and device 30d provides a job request for data item d. The delivery of the requests to broadcast server 10 can be performed by any uplink method. For instance, the requests for data can be made via wireless interface, over phone lines, by computer interface, etc. Since the present invention, in accordance with one embodiment, is concerned primarily with the scheduling of the downlink transmission, any method now known or later conceived for uplinking the job request is contemplated.

In response to the job requests, broadcast server 10 determines a schedule to serve the job requests, in accordance with one embodiment of the invention, and then transmits the requested data items via downlink 34 so as to satisfy the job requests. The downlink broadcast can vary significantly in bandwidth, depending on the type of communication channel being employed. Currently, there are systems, for example, that deliver internet data via satellite having a downlink bandwidth capacity of 400 K-bits per second, wireless LANs that provide in-house internet access having a downlink bandwidth capacity of 1–2 M-bits per second, and personal wireless telecommunications phone systems having a downlink bandwidth capacity of 32 K-bits per second. Any technology that supports the downlink broadcast of information is contemplated. Receivers 31, 32 and 33 of client devices 30a, 30b and 30d, respectively, are configured to receive the corresponding transmitted data item which was requested.

Figure 2:
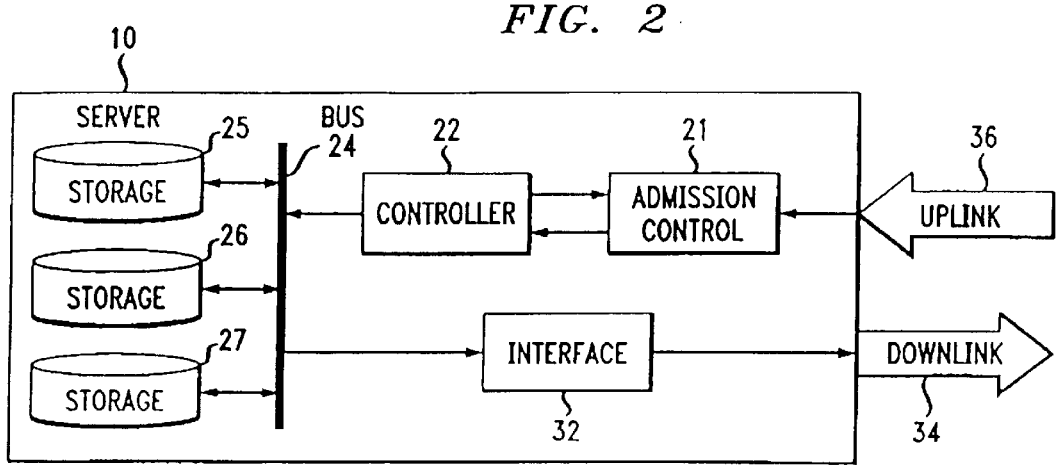
FIG. 2 illustrates the components of a broadcast server, in accordance with one embodiment of the present invention.

FIG. 2 illustrates the features of a typical broadcast server 10 that employs various embodiments of the present invention. The scheduling arrangement of the present invention may be employed in any broadcast server system that is configured to receive a job requests from a plurality of clients.

In FIG. 2, broadcast server 10 is configured to broadcast data items via downlink 34 to a plurality of clients in response to requests received from such clients via uplink 36. As shown in FIG. 1, these requests may take the form of requests for data items a, b and d by client devices 30a, 30b and 30d, respectively. Broadcast server 10 includes a plurality of storage devices such as 25–27, which are configured to provide the plurality of data items upon request.

Broadcast server 10 includes, in one embodiment, an admission control circuit 21, which is configured to analyze an incoming request and determine whether the request will be acknowledged or denied. The request might be denied for any number of reasons, e.g.—the person making the request is not authorized to make the request, the request is incompatible with the server system, etc. An input port of admission control circuit 21 is coupled to uplink 36 which is configured to deliver the job requests. Admission control circuit 21 receives and stores for each job request, among other things, the time the request arrives, the length of the request, the data item requested, and the bandwidth or data rate necessary to serve the request.

In accordance with one embodiment of the invention, controller 22 is a microprocessor. An input port of controller 22 is coupled to an output port of admission control circuit 21. An output port of controller 22 is coupled to an input port of admission control circuit 21. Controller 22 employs the scheduling arrangement described herein, by performing the calculations and determining which job requests to broadcast. Controller 22 also keeps track of all of the pending job requests. When a particular data item is broadcast, controller 22 eliminates from the list of pending job requests all job requests for that particular data item which arrived at admission control circuit 21 prior to controller 22 starting to broadcast the data item, as will be discussed further below.

Storage devices 25–27 are configured to provide data to an internal bus system 24 in response to signals provided by controller 22, although the invention is not limited in scope in that respect. Data retrieved from storage devices 25–27 is provided to the clients via interface unit 35 and downlink 34. As previously mentioned, when a data item is broadcast via downlink 34, all job requests for that data item, which arrived prior to the start of the broadcast, are satisfied simultaneously.

It should also be noted that, although one embodiment of the invention is disclosed in the context of discrete functioning elements such as an admission control circuit and a controller, it is understood that different discrete functioning elements or software could be employed to carry out the present invention.

In one embodiment of the invention, admission control circuit 21 has prior knowledge of the arrival time of job requests to be scheduled by controller 22. A scheduling system based on such an arrangement is referred to as "off-line" scheduling. Thus, in an off-line scheduling arrangement, the system has knowledge of all the jobs that need to be serviced, and can determine the optimal schedule for the job requests prior to starting to service the job requests. The steps conducted by one embodiment of the present invention, which employs an off-line scheduling arrangement, are shown and described in FIG. 3.

In another embodiment of the invention, admission control circuit 21 does not store all of the job requests before directing them to controller 22 or have prior knowledge of the arrival times of future job requests. A scheduling system based on such an arrangement is referred to as "on-line" scheduling. Unlike an off-line system, in which a series of calculations to find the optimal schedule is performed prior to actually servicing the job requests, an on-line system is one in which the controller determines a schedule, based upon job requests which have previously been processed, while simultaneously processing the currently pending job requests. The steps conducted by one embodiment of the present invention, which employs an on-line scheduling arrangement, are shown and described in FIG. 4.

Figure 3:
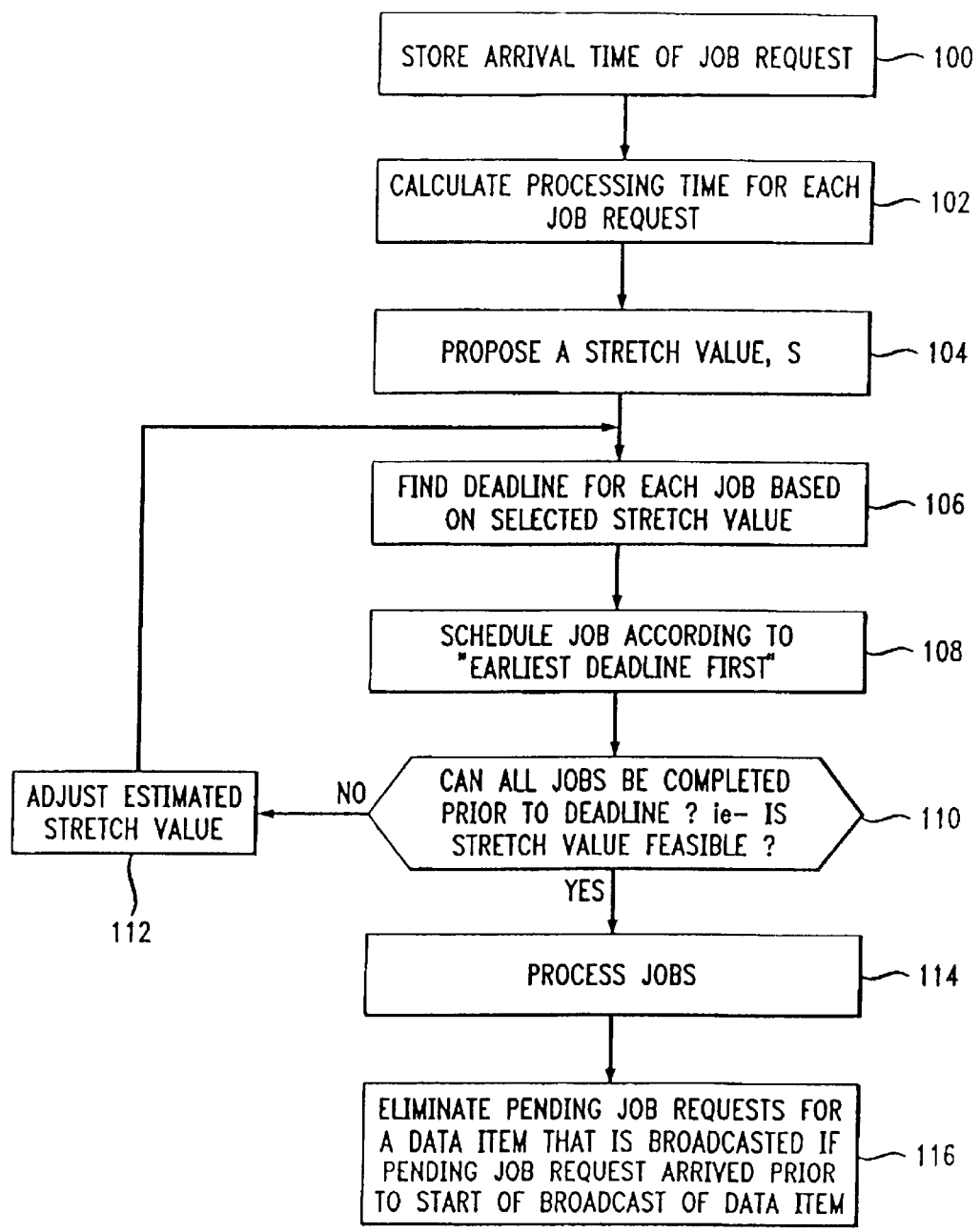
FIG. 3 is a flow chart which illustrates the steps of scheduling and processing a plurality of broadcast job requests in the off-line setting, in accordance with one embodiment of the present invention.

FIG. 3 is a flow chart which illustrates the steps of scheduling the broadcast of a plurality of data items in response to job requests, referred to as the BASE scheduling method, as employed in the off-line setting and in accordance with one embodiment of the present invention. At step 100, the arrival time, $A_i$, of a job request is stored by broadcast server 10. The arrival time of the job request is the point in time when the server receives the job request.

At step 102, broadcast server 10 calculates a processing time, $P_i$, for the job request. The processing time for a job request is the amount of time it would take for broadcast server 10 to complete the job request if broadcast server 10 could service the job request immediately and without interruption, i.e.—without the job request waiting for other jobs to finish before starting, and without the service of the job request being preempted by broadcast server 10 to service other requests. In the preferred embodiment, broadcast server 10 calculates the processing time as a function of the size of the data items, such as by dividing the size (i.e.—in bytes) of the data item requested by the downlink bandwidth (i.e.—in bytes per second).

At step 104, broadcast server 10 proposes a stretch value to utilize in scheduling the job requests. A stretch value provides an indication of the delay experienced by each job request to complete, when the server processes many job requests concurrently. Specifically, a stretch value exists because, in the preferred embodiment of the invention, broadcast server 10 employs preemption. Preemption is a scheduling technique in which a server alternates between a plurality of different pending job requests, servicing portions of each job request until eventually all of the job requests are complete. Thus, the stretch value is defined herein as a ratio equal to the time that broadcast server 10 requires to service a particular job request while also serving other uncompleted job requests in the system, divided by the time that broadcast server 10 would require to service that particular job request if no other job requests were required to be serviced. It should be noted though that, although a stretch value can exist for an individual job request, the stretch value is preferably not calculated separately for each individual job request but is instead proposed as a first step for application to the entire set of pending job requests, as will be shown in step 106 below. Initially, the proposed stretch value can be a random or arbitrarily chosen number or can be based on previously found stretch values.

Once step 104 is satisfied and a stretch value has been proposed, broadcast server 10 proceeds to step 106. At step 106, broadcast server 10 uses the proposed stretch value to calculate the deadlines, $D_i$, for all of the uncompleted job requests remaining to be serviced. For an uncompleted job request i, the deadline $D_i$, is equal to the arrival time of that job, $A_i$, plus the product of the proposed stretch value, S (designated as S, rather than $S_i$, because the selected stretch value is applied to all of the job requests in the set, while the use of $S_i$ would inaccurately suggest that job i has a stretch value which is different from other jobs in the set), times the processing time, $P_i$, such that:

$$D_i = S \times P_i + A_i.$$

At step 108, once the deadline for each uncompleted job is calculated, broadcast server 10 schedules the jobs, in one embodiment of the present invention, according to an earliest deadline first ("EDF") methodology. According to the EDF methodology, the first job request that broadcast server 10 schedules for service is the job request which has the earliest deadline, as found in step 106, relative to all of the other jobs. It then chooses the job request with the next earliest deadline, and schedules it to be serviced second, and so on until all of the job requests have been scheduled.

At decision step 110, broadcast server 10 inquires whether, if serviced according to the schedule determined by the EDF methodology, each and every one of the job requests will be completed prior to its respective deadline as calculated in step 106. If any job request is not able to be completed prior to its respective deadline, then the proposed stretch value is not feasible and the job requests are not serviced according to the schedule determined by the EDF methodology in step 108 of the current iteration.

Instead, broadcast server 10 preferably increases the proposed stretch value at step 112. From step 112, broadcast server 10 returns to step 106. Broadcast server 10 re-performs steps 106 to 110 in order to check the feasibility of the new proposed stretch value. Broadcast server 10 repeats these steps iteratively, progressively increasing the stretch value, until a feasible stretch value is found which enables all of the job requests, when scheduled in step 108 according to the EDF methodology, to be completed within their respective deadlines (as calculated in step 106).

When a feasible stretch value is found, broadcast server 10 proceeds to step 114, where it services all of the job requests in the order dictated by the EDF schedule, as found in step 108 of the current iteration. As previously noted, according to one embodiment of the invention, when the server broadcasts a particular data item, all of the job requests for that data item, having arrival times before the data item is serviced, are simultaneously satisfied. Thus, in one embodiment of the invention, controller 22 keeps track of all of the pending job requests, and, at step 116, eliminates all pending job requests for a data item when that data item is broadcast, provided that the job requests arrived before the start of the broadcast of the data item. Job requests for the data item which arrive after the data item has started to be serviced have missed a portion of the broadcast, and are therefore treated as separate job requests which are not serviced by the current broadcast. Since the subsequently arriving job request has missed a portion of the broadcast, it must wait until the data item is re-broadcast in order to receive the entire data item.

It is noted, however, that the present invention contemplates an on-demand broadcast system in which a subsequently arriving job request does receive the broadcast of the remaining portion of the data item. In this case, the job request must wait only for the re-broadcast of the portion of the data item which it missed from the original broadcast. This system requires the client device which makes the job request to be capable of receiving the data item in portions which are out of order, and then re-arranging the portions so as to duplicate the original data item.

In accordance with one embodiment of the invention, the schedule determined by controller 22 incorporates preemption. For instance, if a job request for a first data item is currently being broadcast by server 10, the broadcast may be interrupted in order to broadcast a subsequently arriving job request for a second data item. This may occur when the second data item is relatively small, and the job requesting it has an earlier deadline than the job request for the larger first data item. This preemptive scheduling arrangement prevents the delay in broadcasting the small second data item from adversely affecting the performance of the schedule.

In one embodiment of the invention, the adjustment at step 112 (of the flowchart in FIG. 3) to the proposed stretch value is accomplished by doubling the previously proposed stretch value. In yet another embodiment, once the system determines that a feasible stretch value falls between two integers, k and 2k, the feasible stretch value is adjusted further by performing a binary search for an optimal feasible stretch value. The optimal feasible stretch value is the smallest feasible stretch value that enables all of the job requests, when scheduled in step 108 according to the EDF methodology, to be completed within their respective deadlines (as calculated in step 106).

This off-line scheduling arrangement, in which server 10 calculates a schedule for a known set of pending job requests by utilizing the EDF methodology, is referred to as the BASE method. Because the set of pending job requests is known, the BASE method is able to generate an optimal schedule to serve the job requests. Additional methods employing a preemptive scheduling arrangement are also possible, such as by modifying the prior art "LWF" and "SRST" methods. In accordance with one embodiment, the Preemptive Longest Wait First (hereinafter "PLWF") method determines subsequent data items to be broadcast by choosing the data item with the largest total sum of waiting times, as previously explained. The PLWF method differs from the prior art LWF method in that, if midway through broadcasting a first data item, subsequent job requests arrive which give a second data item a longer total waiting time, the broadcast of the first data item will be interrupted in order to broadcast the second data item.

In accordance with another embodiment, the Shortest Remaining Service Time (hereinafter "SRST") method determines subsequent data items to be broadcast by choosing the data item which can be completed in the least amount of time. The SRST method differs from the prior art SSTF method in that, if midway through broadcasting a first data item, a subsequent job request arrives which can be completed more quickly than the first data item, the broadcast of the first data item will be interrupted in order to broadcast the second data item.

Figure 5:
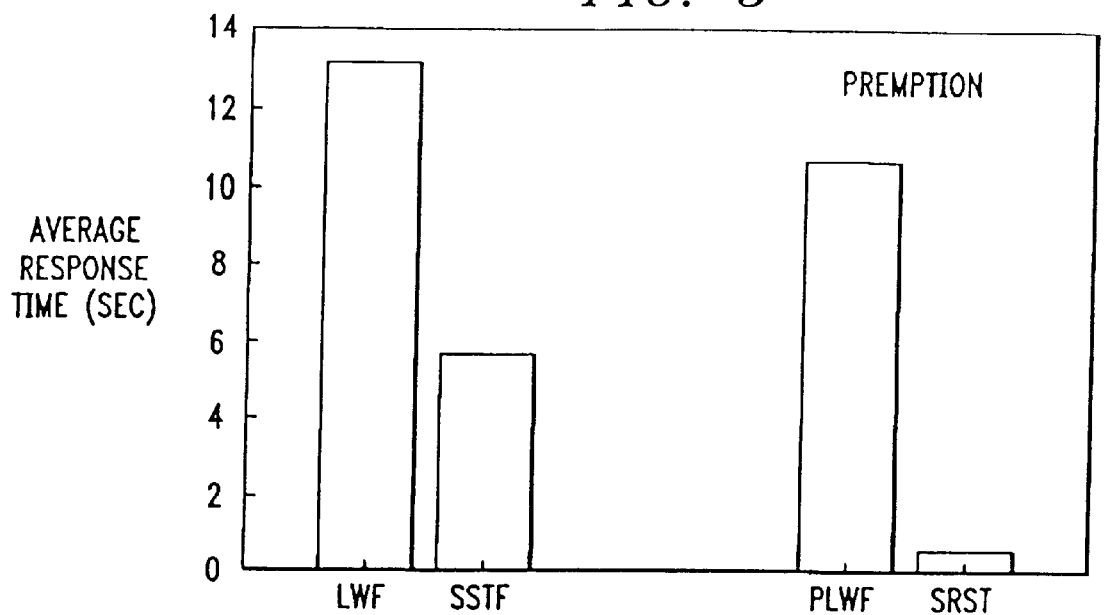
FIG. 5 is a graph which illustrates the improvements to the average response time of the job requests when scheduled in accordance with one embodiment of the invention.
Figure 6:
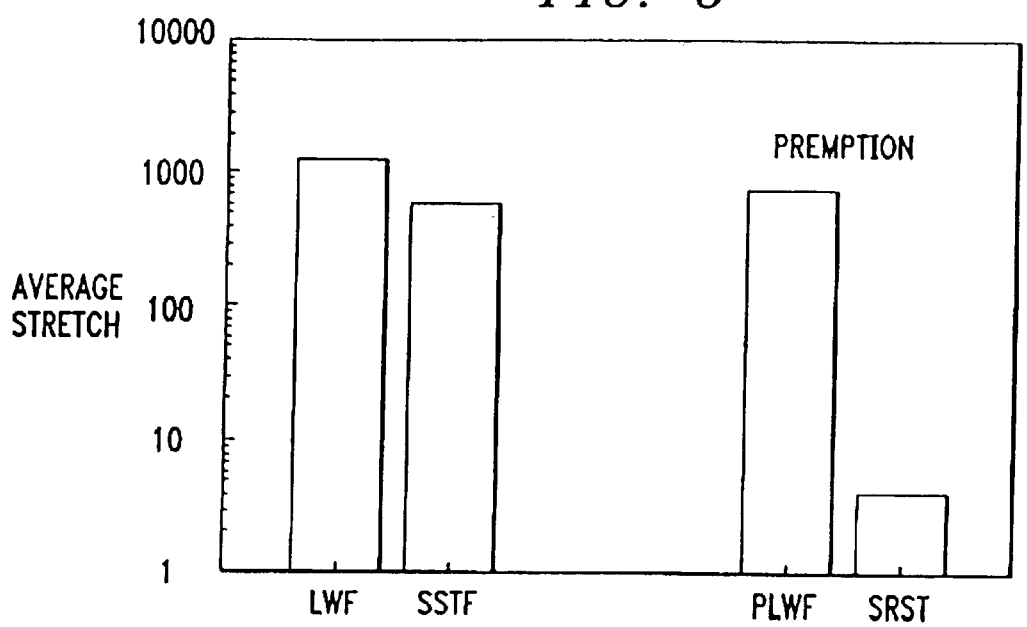
FIG. 6 is a graph which illustrates the improvements to the average stretch of the job requests when scheduled in accordance with one embodiment of the invention.

As previously mentioned, the present invention seeks to find a schedule that balances the conflicting requirements of the individual performance for each job request with the global performance of the broadcast system, such that the system is responsive to each job request and avoids starvation of any job request. In other words, the schedule sought balances the need to minimize the worst case completion time of a job request and the need to minimize the average response time for the job requests. FIGS. 5 and 6 illustrate the advantages of employing preemption in accordance with the various embodiments of the present invention. As shown in FIG. 5, the PLWF method generates a schedule that improves the average response time of the job requests over the LWF method, while the SRST method generates a schedule that improves the average response time over the SSTF method. Similarly, as shown in FIG. 6, the PLWF method generates a schedule that improves the average stretch of the job requests over the LWF method, while the SRST method generates a schedule that improves the average stretch over the SSTF method.

Though not shown, the BASE scheduling method, as illustrated in FIG. 3, is even superior to the other preemptive methods in generating a schedule, and hence is superior to the prior art methods also. However, the BASE method is not always desirable to use. For instance, while it is possible to utilize the BASE method in an on-line setting, it may not be practical to do so. This follows because the BASE scheduling method requires the controller to determine a schedule based on all incoming job requests, which requires large amounts of memory and processing power. Instead, in the on-line setting, prior stretch values, or modified stretch values are utilized, as will be discussed below.

Figure 4:
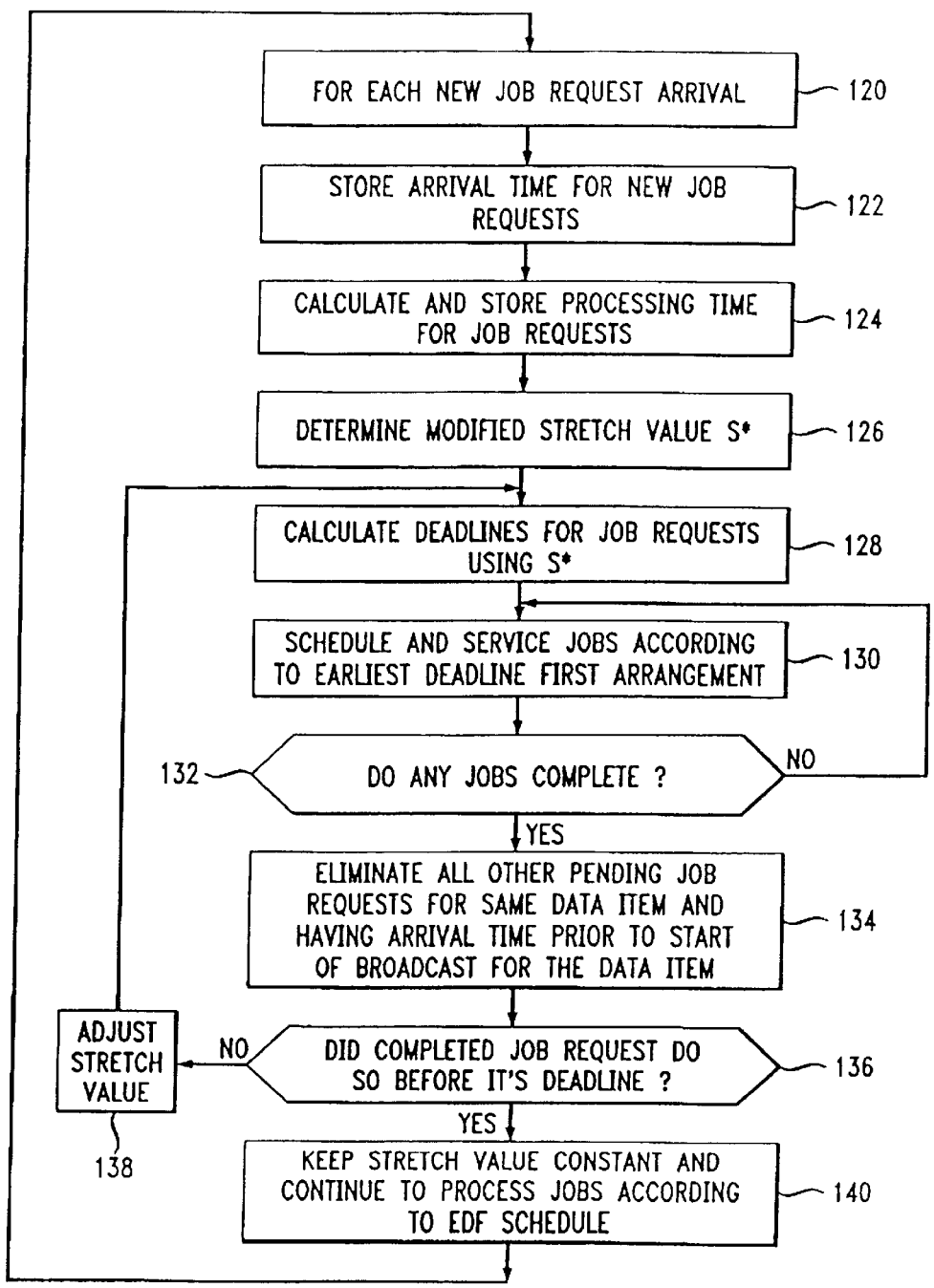
FIG. 4 is a flow chart which illustrates the steps of scheduling and processing a plurality of broadcast job requests in the on-line setting, in accordance with one embodiment of the present invention.

FIG. 4 is a flow chart which illustrates the steps for scheduling the broadcast of a plurality of data items in response to job requests in an on-line setting, in accordance with another embodiment of the invention. As previously mentioned, an on-line scheduling arrangement is one which must determine how to schedule the job requests based upon job requests that have already been received. Thus, a server system which employs an on-line scheduling arrangement begins servicing the jobs before determining an optimal stretch value.

At step 120 of the flow chart, a new job request arrives at broadcast server 10. Typically in the on-line setting, broadcast server 10 will currently be servicing a plurality of pending job requests when the new request arrives. At step 122, the arrival time, $A_i$, of the newly arrived job request is stored by broadcast server 10.

At step 124, broadcast server 10 calculates and stores a processing time, $P_i$, of the arrived job request. As shown and described in reference with FIG. 3, the processing time for a job request is the amount of time it would take for broadcast server 10 to complete the job request if broadcast server 10 could service the job request immediately and without interruption, i.e.—without the job request waiting for other jobs to finish before starting, and without the service of the job request being preempted by broadcast server 10 to service other requests.

Instead of considering all of the job requests arrived to the server, the on-line scheduling arrangement, in accordance with one embodiment of the invention, considers the job requests that have arrived during a history window, defined by a history window parameter. A history window parameter comprises a specified set of job requests having n number of job requests, where n is an integer. The value of n is advantageously chosen by the operator of server system 10. While it is possible that n equals the total number of jobs serviced by the system, it may be desirable to avoid storing or calculating arrival times and processing times for the entire history at every arrival. Therefore, in one embodiment, n is a finite number in the range of 10 to 100, corresponding to the last 10 to 100 jobs which were serviced by the system immediately proceeding the arrival of the presently arrived job. Not only does the selection of an n value in this range control the cost of scheduling, but also prevents a momentary surge of arrivals a long time ago from inducing the controller to compute a large processing time ratio ever after.

Figure 7:
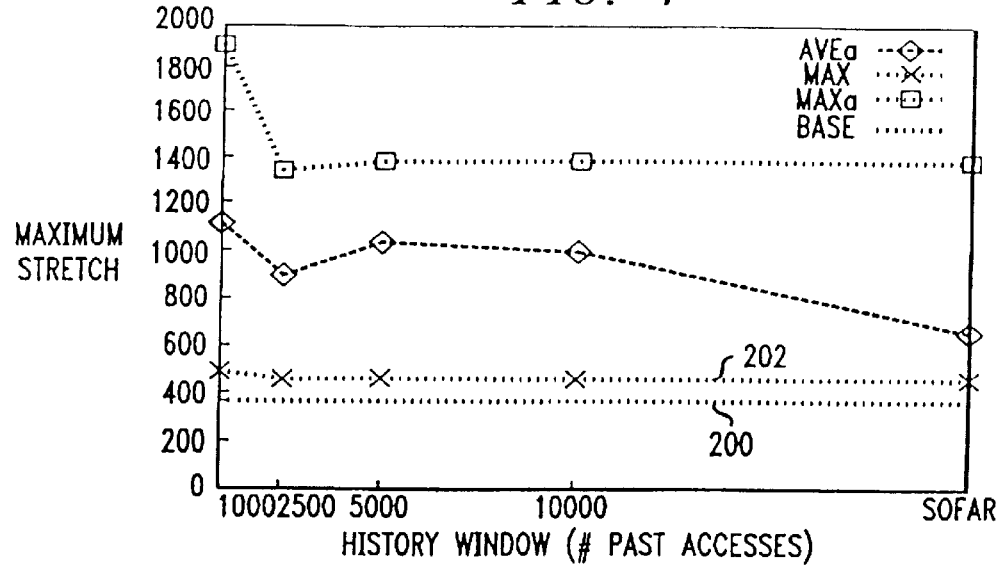
FIG. 7 is a graph which illustrates the maximum stretch performance, as employed by various embodiments of the invention.
Figure 8:
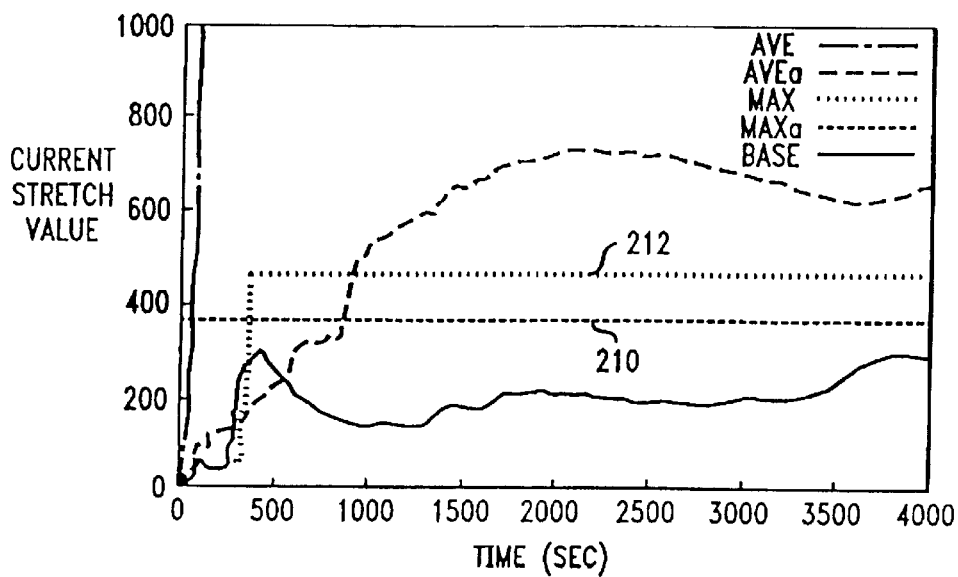
FIG. 8 is a graph which illustrates the values of the modified stretch, as employed by various embodiments of the invention.

At step 126, broadcast server 10 determines a modified stretch value, S*. The modified stretch value S* can be determined in various ways. In the preferred embodiment (referred to as MAX), the modified stretch value is the maximum stretch value for a completed job request found during a specified history window parameter. In another embodiment (referred to as AVG), the modified stretch value is the average of the stretch values found for all of the job requests which were completed during the history window parameter. In another embodiment (referred to as $MAX_\alpha$), the modified stretch value is the maximum stretch value for a completed job request multiplied by an additional factor, such as the square root of the ratio:

$$\Delta j = \frac{\max\{P_{j-n} \ldots P_j\}}{\min\{P_{j-n} \ldots P_j\}}$$

which represents the ratio of the maximum processing time for a completed job divided by the minimum processing time for a completed job during the history window parameter. In another embodiment (referred to as $AVG_\alpha$), the modified stretch value is the average of the stretch values found for all of the job requests which were completed during the history window parameter, as a function of an additional factor, such as the square root of the ratio found above. A comparison of the performance results for each method is shown in FIGS. 7 and 8, which will be explained later.

At step 128, broadcast server 10 uses the modified stretch value, S*, to calculate the deadlines, D, for all of the uncompleted jobs remaining to be serviced. For an uncompleted job request i, the deadline $D_i$, is equal to the arrival time of that job, $A_i$, plus the product of the modified stretch value, S*, times the processing time, $P_i$, such that:

$$D = S^* \times P_i + A_i.$$

At step 130, in accordance with one embodiment of the present invention, broadcast server 10 schedules the pending jobs in accordance with an EDF methodology, and services the job requests in the order dictated by the EDF schedule. According to the EDF schedule, the job request with the earliest deadline, as calculated in step 128, is serviced first, then the job request with the second earliest deadline is serviced second, etc.

At step 132, after the system has begun servicing the pending job requests, the method inquires whether any of the pending jobs are completed. As previously noted, according to one embodiment of the invention, when broadcast server 10 broadcasts a particular data item, all of the job requests for that data item, having arrival times before server 10 began to service the data item, are simultaneously satisfied. Thus, in one embodiment of the invention, controller 22 keeps track of all of the pending job requests, and, at step 134, eliminates all pending job requests for a specific data item when that data item is serviced. Job requests for the data item which arrive after the data item has started to be serviced, and therefore have missed a portion of the broadcast, are treated as separate job requests which must wait until the data item is re-broadcast in order to receive the entire data item. As noted previously, however, the present invention also contemplates a system in which a subsequently arriving job request does receive the broadcast of the remaining portion of the data item and waits for the re-broadcast of the missed portion only.

At step 136, broadcast server 10 determines if, at the modified stretch value, S*, the completed job request was completed prior to its respective deadline. If so, the modified stretch value is feasible and the system proceeds to step 140, where it maintains the current modified stretch value and continues to process the jobs according to the schedule found in step 130.

If, using the modified stretch value, a completed job request is not completed prior to its corresponding deadline, then the modified stretch value is not feasible. It is therefore adjusted at step 138. This method is repeated until the modified stretch value permits job requests being completed to do so within their respective deadlines. In accordance with the preferred embodiment of the invention, the deadlines calculated in step 128 remain constant even after the modified stretch value is adjusted at step 138 and the adjusted modified stretch value is used to calculate deadlines for the newly arriving job requests only.

As may be the case, a subsequent job request will arrive to be serviced while server system is processing the existing job requests in accordance with step 140. If this is the case, then broadcast server 10 returns to step 120 of the flow chart to re-perform steps 120 through 140.

In accordance with one embodiment of the invention, the schedule determined by controller 22 incorporates preemption. As with the scheduling arrangement in the off-line setting, if a job request for a first data item is currently being broadcast by server 10, the broadcast may be interrupted in order to broadcast a subsequently arriving job request for a second data item, that has an earlier deadline than the job request for the first data item.

Each of the methods discussed above, which determine a modified stretch value, utilize the EDF methodology to schedule the job requests. It is possible, however, to use other scheduling methodologies. For instance, the SRST method, which schedules the pending job requests according to the remaining time to process each request, can be utilized.

As previously mentioned, FIGS. 7 and 8 illustrate the performance results of various methods of determining the modified stretch value S*. In each figure, the BASE curve (represented by curve 200 in FIG. 7 and curve 210 in FIG. 8) shows the results which would have been achieved if the system had employed the BASE method at each new job arrival. The BASE curve, though impractical, is the benchmark performance desired to be attained by each of the other methods.

FIG. 7 shows the maximum stretch performance for the MAX, $MAX_\alpha$, and $AVG_\alpha$ methods. The extreme right on the x-axis (So Far) indicates that all requests from the beginning are accounted for in the calculations. As shown, the MAX curve, represented by curve 202, has the best results of all the discussed methods, which can be seen by its close proximity to BASE curve 200 at all history window parameter values.

FIG. 8 shows the values of the modified stretch utilized by each of the MAX, $MAX_\alpha$, AVG and $AVG_\alpha$, methods. The x-axis shows the time for the first 4,000 seconds. Curve 210 represents the fixed stretch value determined by the BASE scheduling method. As shown, curve 212 for the MAX scheduling method most closely resembles BASE method curve 210, and thus consistently determines a modified stretch value similar to the values known to generate the best possible scheduling arrangement.

While there has been shown and described particular embodiments of the invention, it will be obvious to those skilled in the art that changes and modifications can be made therein without departing from the invention, and therefore, the appended claims shall be understood to cover all such changes and modifications as fall within the true spirit and scope of the invention.

We claim:

1. A method comprising the steps of:
receiving at a broadcast server a plurality of job requests for a plurality of data items;
calculating a deadline, $D_i$, for each of said plurality of job requests, given by $D_i=S \times P_i+A_i$, wherein $P_i$ is a processing time corresponding to each said job request, $A_i$ is an arrival time corresponding to each said job request, and S is a stretch value;
determining a schedule for processing said job requests so that data items responsive to each job request are broadcasted within said deadlines corresponding to each said job requests; and
eliminating job requests, for a same data item, that are pending while said broadcast server broadcasts said requested data item.

2. The method of claim 1, wherein said processing time further comprises a value corresponding to the size of each said job request divided by a broadcast bandwidth.

3. The method of claim 1, further comprising the step of proposing said stretch value.

4. The method of claim 3, further comprising the step of calculating said deadlines for each of said job requests as a function of said proposed stretch value.

5. The method of claim 4, wherein said scheduling step further comprises scheduling said job requests, at said proposed stretch value, according to an "earliest deadline first" arrangement.

6. The method of claim 5, wherein said stretch value is a feasible stretch value if, when processed in an order dictated by said "earliest deadline first" arrangement, a completion time of each and every said job request is prior to said corresponding deadline for each said job request at said feasible stretch value.

7. The method of claim 6, further comprising the steps of:
iteratively adjusting said stretch value until said stretch value is a feasible stretch value; and
after finding said feasible stretch value, processing said job requests in an order dictated by said "earliest deadline first" arrangement, said "earliest deadline first" arrangement corresponding to said stretch values determined in the latest iteration.

8. The method of claim 7, wherein said adjusting step further comprises adjusting said proposed stretch value by doubling said proposed stretch value.

9. The method of claim 8, wherein said feasible stretch value further comprises an optimal feasible stretch value, said method further comprising the step of adjusting said proposed stretch value until a feasible stretch value is found, said optimal feasible stretch value corresponding to the smallest feasible stretch value that permits said each and every job request to have a completion time prior to deadline of said job request at said optimal feasible stretch value.

10. The method of claim 9, wherein said adjusting step further comprises performing a binary search for said optimal feasible stretch value after said controller determines that said feasible stretch value falls between said proposed stretch value and double said proposed stretch value.

11. The method of claim 1, wherein said plurality of job requests further comprises a set having n number of job requests, wherein n is an integer.

12. The method of claim 11, wherein said integer n has a value that is equal to a total number of job requests processed by said server system.

13. The method of claim 11, wherein said integer n has a value that is less than a total number of job requests processed by said server system.

14. A method for transmitting data items in an on-demand broadcast system, the method comprising the steps of:
receiving at a broadcast server a new job request for a data item while said broadcast server is processing a plurality of pending job requests for a plurality of data items;
calculating a deadline, $D_i$, for each of said received and pending job requests, given by $D_i=S^* \times P_i+A_i$, wherein $P_i$ is a processing time corresponding to each said job request, $A_i$ is an arrival time corresponding to each said job request, and S* is a modified stretch value estimated based on job requests arrived during a history window defined by a history window parameter;
determining a schedule for processing said job requests as a function of $D_i$ such that data items responsive to said job requests are transmitted prior to said deadline; and
eliminating job requests that are pending for a same data item, when broadcast server broadcasts said data item.

15. The method of claim 14, wherein said processing time further comprises a value corresponding to the size of each said job request divided by a broadcast bandwidth.

16. The method of claim 14, wherein said modified stretch value corresponds to the product of the square root of a ratio times a stretch value, said ratio equal to a maximum processing time for a job request within said history window divided by a minimum processing time for a job request within said history window.

17. The method of claim 14, wherein said modified stretch value corresponds to a maximum stretch value for all of said job requests arrived within said history window.

18. The method of claim 14, wherein said modified stretch value corresponds to an average stretch value for all of said job requests arrived within said history window.

19. The method of claim 14, wherein said modified stretch value corresponds to an average stretch value for all of said job requests arrived within said history window, multiplied by a ratio equal to a maximum processing time for a job request arrived within said history window divided by a minimum processing time for a job request arrived within said history window.

20. The method of claim 14, wherein said scheduling step further comprises scheduling said job requests according to an "earliest deadline first" arrangement, said "earliest deadline first" arrangement utilizing said deadlines calculated as a function of said modified stretch value.

21. The method of claim 20, further comprising the steps of adjusting said stretch value upon an arrival of a new job request.

22. The method of claim 20, further comprising the steps of adjusting said stretch value upon said completion of any said job request.

* * * * *